(12) United States Patent
Ueda

(10) Patent No.: US 9,778,624 B2
(45) Date of Patent: Oct. 3, 2017

(54) MOTOR CONTROL DEVICE

(71) Applicant: MITSUBISHI ELECTRIC CORPORATION, Chiyoda-ku (JP)

(72) Inventor: Koichiro Ueda, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 204 days.

(21) Appl. No.: 14/780,834

(22) PCT Filed: Feb. 27, 2014

(86) PCT No.: PCT/JP2014/054899
§ 371 (c)(1),
(2) Date: Sep. 28, 2015

(87) PCT Pub. No.: WO2014/171191
PCT Pub. Date: Oct. 23, 2014

(65) Prior Publication Data
US 2016/0041533 A1     Feb. 11, 2016

(30) Foreign Application Priority Data
Apr. 18, 2013 (JP) .................. 2013-087619

(51) Int. Cl.
*G05B 5/01* (2006.01)
*G05B 19/19* (2006.01)
(Continued)

(52) U.S. Cl.
CPC .............. *G05B 5/01* (2013.01); *G05B 19/19* (2013.01); *G05D 19/02* (2013.01); *B29C 45/76* (2013.01);
(Continued)

(58) Field of Classification Search
CPC .......... G05B 5/01; G05B 19/02; G05B 19/19; G05B 2219/37399; G05B 2219/42087;
(Continued)

(56) References Cited

U.S. PATENT DOCUMENTS

| 6,811,387 B1 | 11/2004 | Tsutsumi et al. |
| 2003/0057901 A1 | 3/2003 | Tomita |

(Continued)

FOREIGN PATENT DOCUMENTS

| CN | 1426545 A | 6/2003 |
| JP | 2007-237312 | 9/2007 |

(Continued)

OTHER PUBLICATIONS

Combined Taiwanese Office Action and Search Report issued Jul. 22, 2015 in Taiwanese Patent Application No. 103113641 (Total 8 pages).

(Continued)

*Primary Examiner* — Dennis M Butler
(74) *Attorney, Agent, or Firm* — Oblon, McClelland, Maier & Neustadt, L.L.P.

(57) ABSTRACT

A motor control device. When the motor control device executes pressure control of which a minor loop is speed control or position control, the pressure control is executed in a manner that pressurization or depressurization is performed while a control parameter of the speed control is fixed; a control parameter of the pressure control is gradually increased; an oscillation amount is successively detected and stored. If the oscillation amount exceeds an acceptable value, on the basis of the control parameter of the pressure control and the oscillation amount stored during adjustment, the control parameter of the pressure control is adjusted such that the oscillation amount is equal to or less than the acceptable value.

10 Claims, 11 Drawing Sheets

(51) Int. Cl.
  *G05D 19/02* (2006.01)
  *B29C 45/77* (2006.01)
  *B29C 45/76* (2006.01)

(52) U.S. Cl.
  CPC .... *B29C 45/77* (2013.01); *G05B 2219/37399* (2013.01); *G05B 2219/42087* (2013.01); *G05B 2219/45244* (2013.01)

(58) Field of Classification Search
  CPC .......... G05B 2219/45244; G05D 19/02; B29C 45/76; B29C 45/77
  See application file for complete search history.

(56) References Cited

U.S. PATENT DOCUMENTS

| | | |
|---|---|---|
| 2007/0210740 A1 | 9/2007 | Sato et al. |
| 2008/0066515 A1 | 3/2008 | Iwashita et al. |
| 2009/0126453 A1* | 5/2009 | Suzuki ............... B21D 24/10 72/453.13 |
| 2010/0052593 A1 | 3/2010 | Kishimoto et al. |
| 2012/0268054 A1 | 10/2012 | Kishimoto et al. |
| 2013/0032961 A1 | 2/2013 | Ueda et al. |
| 2013/0033220 A1* | 2/2013 | Ueda ............... B29C 45/77 318/689 |
| 2013/0033221 A1* | 2/2013 | Ueda ............... G05B 13/041 318/689 |
| 2013/0063068 A1 | 3/2013 | Ueda et al. |

FOREIGN PATENT DOCUMENTS

| | | |
|---|---|---|
| JP | 2008-73713 A | 4/2008 |
| JP | 4185128 B2 | 11/2008 |
| JP | 4889835 B1 | 3/2012 |
| JP | 4998475 B2 | 8/2012 |
| TW | 201307031 A | 2/2013 |
| WO | 01/89800 A1 | 11/2001 |
| WO | 2012/008222 A1 | 1/2012 |
| WO | 2013/018189 A1 | 2/2013 |

OTHER PUBLICATIONS

International Search Report issued Apr. 8, 2014 in PCT/JP2014/054899 filed Feb. 27, 2014.

* cited by examiner

MOTOR CONTROL DEVICE

FIELD

The present invention relates to a motor control device.

BACKGROUND

In industrial machines including molding machines such as injection molding machines and press molding machines as well as bonding machines, pressure control has been adopted. With pressure control, a pressure signal from a machine is detected when a mechanical drive unit driven by a motor is pressed against a workpiece and the like, which act as pressurization targets; a pressure control computation is set by a control parameter on the basis of the pressure signal; and target pressure is applied, so that the motor is operated. The control parameter is the gain and the like of the pressure control computation.

It is necessary to appropriately adjust the control parameter during the pressure control described above. If a control parameter such as gain is excessively large, oscillation occurs and thus the control system operates unstably. Or, even if the operation of the control system does not become unstable, a small vibration is generated in a pressure signal and it is transmitted to the workpiece and the like, and the result of the machining is adversely affected. Conversely, if the control parameter is excessively small, it takes time to reach the target pressure (the command signal for the pressure, the pressure command signal). Further, when disturbance is applied, this disturbance cannot be removed completely. Particularly, the disturbance cannot be compensated for only by feedforward control and is only removed by the pressure control computation (feedback control) performed on the basis of a deviation of a pressure signal from the target pressure. Accordingly, it is important to appropriately adjust a control parameter of a pressure control unit.

For example, Patent Literature 1 discloses a pressure control technique that involves multiplying the pressure deviation of a pressure signal away from the target pressure with a pressure gain so as to determine a motor speed command and by performing a speed control computation that follows the speed command, in which an elastic constant of a pressurization target is calculated and then divided by a predetermined proportional constant so that a pressure gain is calculated.

CITATION LIST

Patent Literature

Patent Literature 1: Japanese Patent Application Laid-open No. 2008-73713

SUMMARY

Technical Problem

However, the conventional technique described above does not include a description about a method of determining a proportional constant. Therefore, there has been a problem in that it is necessary to adjust the proportional constant by trial and error and thus it takes time to determine the proportional constant.

Further, to adjust a control parameter, an elastic constant of the pressurization target needs to be calculated. If the elastic constant of the pressurization target is to be calculated, it is necessary to provide a memory for storing processing data and a calculation load is also necessary. Therefore, the configuration of a device becomes complicated, incurring costs. Further, there has been a problem in that an adjustment procedure becomes complicated and thus more adjustment time is needed.

The present invention has been achieved in view of the above problems, and an objective of the invention is to provide a motor control device that can adjust a gain parameter of pressure control so as to improve control performance while securing stability of a control system.

Solution to Problem

To solve the problems and accomplish the objective described above, the present invention relates to a motor control device that executes pressure control of which a minor loop is speed control or position control. With the pressure control, pressurization or depressurization is performed while a control parameter (gain) of the speed control (or both the speed control and the position control) is fixed and the control parameter of the pressure control is gradually increased; an oscillation amount (or an overshoot amount) is successively detected and stored; and, if the oscillation amount (or the overshoot amount) exceeds an acceptable value (a threshold), on the basis of the control parameter of the pressure control and the oscillation amount (or the overshoot amount) stored during the adjustment, the control parameter of the pressure control is adjusted so that the oscillation amount (or the overshoot amount) is equal to or less than an acceptable value (the threshold).

Advantageous Effects of Invention

According to the present invention, a motor control device that can adjust the gain parameter of pressure control that can improve control performance while securing stability of a control system can be obtained.

DESCRIPTION OF EMBODIMENTS

Exemplary embodiments of a motor control device according to the present invention will be described below in detail with reference to the accompanying drawings. Note that the present invention is not limited to the embodiments.

First Embodiment

Figure 1:
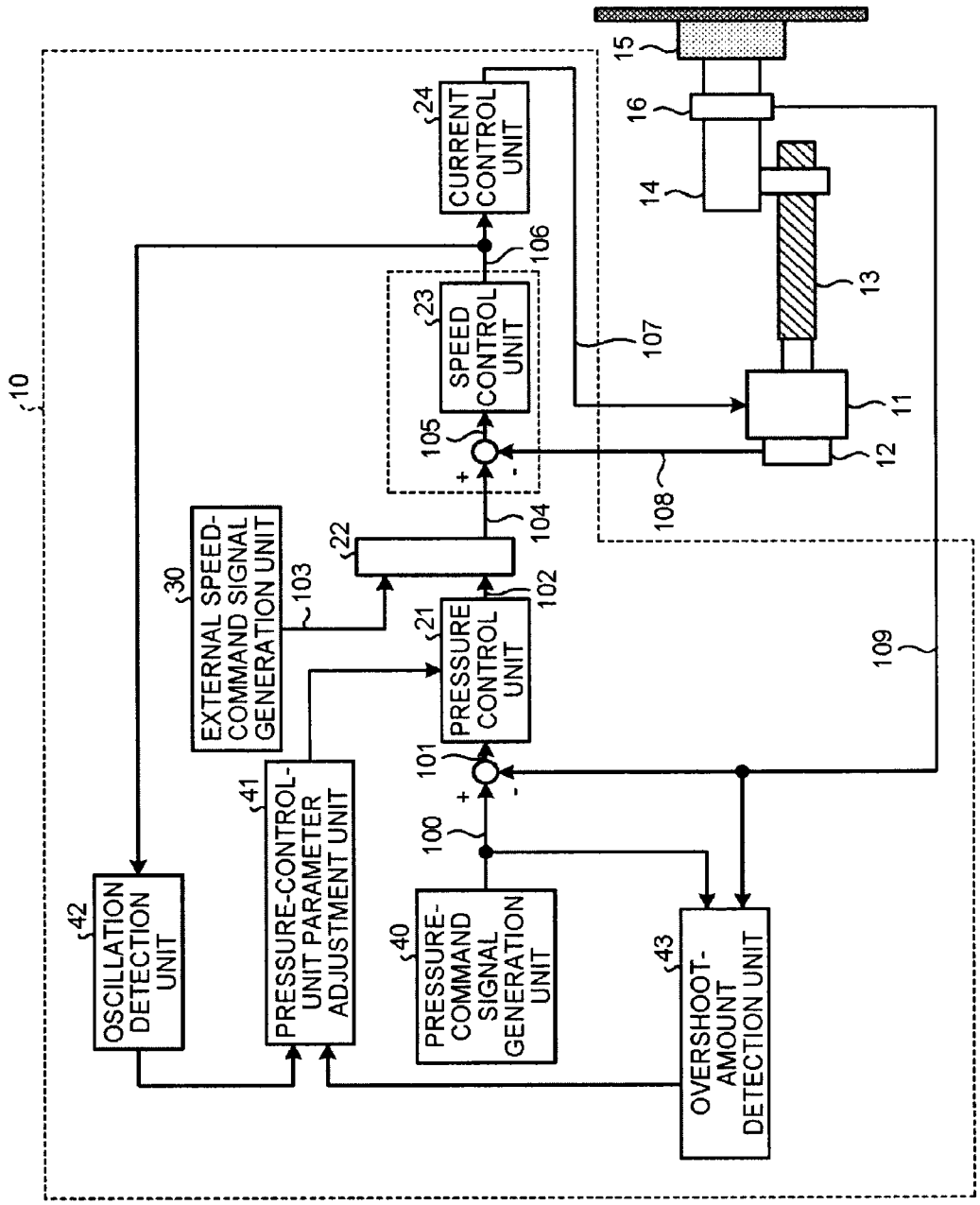
FIG. 1 is a block diagram illustrating a configuration of a motor control device according to a first embodiment.

FIG. 1 is a block diagram illustrating a configuration of a motor control device according to a first embodiment of the present invention. FIG. 1 is a diagram illustrating a motor control device 10, a motor 11, an encoder 12, a ball screw 13, a pressurizing head 14, a pressurization target 15, and a pressure detector 16.

The motor 11 is a rotary motor. The encoder (speed detection unit) 12 detects the rotation speed of the motor 11 and generates a speed detection signal 108. The encoder 12 may be configured to estimate the rotation speed of the motor 11. The ball screw (mechanical drive unit) 13 converts a rotary motion of the motor 11 into a translational motion. That is, the ball screw 13 is a mechanical drive unit that drives the pressurizing head 14 by an operation of the motor 11. The pressurizing head (mechanical load) 14 is driven through the ball screw 13 by the motor 11. The pressurizing head 14 makes contact with and pressurizes the pressurization target 15 so that the pressurization target 15 is machined. The pressure detector 16 is attached to the pressurizing head 14 and detects pressure or force during pressurization. The pressure detector 16 detects, as a pressure detection signal 109, information on pressure or force when the pressurizing head 14 is pressed against the pressurization target 15. A specific example of the pressure detector 16 is a load cell. While FIG. 1 is a diagram illustrating a configuration of the physical providing of a pressure detector and detecting a pressure detection signal, the pressure detector does not need to be a physical detector. It is permissible to provide a pressure detector that estimates pressure when a mechanical load is pressed against a pressurization target from the speed and the torque of a motor and outputs the estimated pressure as a pressure detection signal.

The motor control device 10 illustrated in FIG. 1 includes a pressure control unit 21, a speed-command selection unit 22, a speed control unit 23, a current control unit 24, an external speed-command signal generation unit 30, a pressure-command signal generation unit 40, a pressure-control-unit parameter adjustment unit 41, an oscillation detection unit 42, and an overshoot-amount detection unit 43.

The current control unit 24 supplies a current 107 for driving the motor 11. The process of generating the current 107 is described below.

The pressure-command signal generation unit 40 generates a pressure command signal 100 and outputs the signal 100. The pressure command signal 100 is a profile of the pressure value to be applied to the pressurization target 15 with respect to time.

The pressure control unit 21 receives, as an input signal, a signal 101 corresponding to the deviation (difference) between the pressure command signal 100 from the pressure-command signal generation unit 40 and the pressure detection signal 109 from the pressure detector 16. The pressure control unit 21 performs pressure control computation and calculates a command value of an internal speed-command signal 102 corresponding to the deviation between the command value of the pressure command signal 100 and the detection value of the pressure detection signal 109. That is, the pressure control unit 21 calculates the internal speed-command signal 102 of the motor 11 on the basis of a pressure control parameter so that the pressure detection signal 109 follows the pressure command signal 100.

An example of the pressure control computation performed by the pressure control unit 21 is proportional control. In proportional control, a proportional gain is used as a control parameter, and the product of the proportional gain and a difference obtained by subtracting a value of the pressure detection signal 109 from a value of the pressure command signal 100 is output as the command value of the internal speed-command signal 102. Generally, as the proportional gain increases, the followability of a pressure detection value to a pressure command value is improved. However, if the proportional gain is excessively large, a signal in a control loop exceeds an acceptable value and may be oscillated, or an overshoot may be generated. If a signal in a control loop exceeds an acceptable value and is oscillated, the vibration is also superimposed on a pressure command signal and a pressurization operation is performed on a workpiece while vibration machining of the workpiece is adversely affected. If overshoot is generated, excessive pressure is applied to the pressurization target 15 and the pressurization target 15 may be plastically deformed or broken.

The external speed-command signal generation unit 30 generates an external speed-command signal 103 that indicates the speed at which the motor 11 should be operated regardless of the output signal of the pressure control unit 21.

The value of the external speed-command signal 103 is set according to the speed at which the pressurizing head 14 approaches the pressurization target 15 that is not in contact with the pressurizing head 14.

The speed-command selection unit 22 selects either one of the internal speed-command signal 102 or the external speed-command signal 103 and outputs the selected signal as a speed command signal 104.

The speed control unit 23 receives, as an input signal, a signal 105 corresponding to the deviation (difference) between the speed command signal 104 from the speed-command selection unit 22 and the speed detection signal 108 from the encoder 12. The speed control unit 23 performs speed control computation on the basis of the deviation (difference) between the value of the speed command signal 104 and the value of the speed detection signal 108; calculates a torque command signal 106 for calculating a torque to be generated by the motor 11; and outputs the signal 106. That is, the speed control unit 23 calculates the torque command signal 106 or a force command signal for the motor 11 on the basis of a speed control parameter so that the speed detection signal 108 follows the speed command signal 104 of the motor 11.

An example of the speed control computation performed by the speed control unit 23 is proportional integral control. In this case, a proportional gain and an integral gain are control parameters of the speed control unit 23.

The current control unit 24 receives the torque command signal 106 from the speed control unit 23 as an input signal. The current control unit 24 supplies the current 107 for generating a torque corresponding to the torque command signal 106 to the motor 11. The motor 11 is thus driven by the current 107, pressure applied to the pressurization target 15 is detected by the pressure detector 16, and pressure control is executed so that the pressure follows a pressure command value.

At least one of oscillation information that is detected and output by the oscillation detection unit 42 and an overshoot amount that is detected and output by the overshoot-amount detection unit 43 is input to the pressure-control-unit parameter adjustment unit 41, and a control parameter of the pressure control unit 21 is adjusted.

The oscillation detection unit 42 detects oscillation information (an oscillation amount). Oscillation is a phenomenon where vibration is continuously generated. If a parameter of the pressure control unit 21 or the speed control unit 23 is set to be large enough to be close to a stability limit of a control loop and pressure control is executed, high-frequency vibration is generated and thus oscillation is generated. That is, the oscillation detection unit 42 detects an oscillation of control state quantity.

Figure 2:
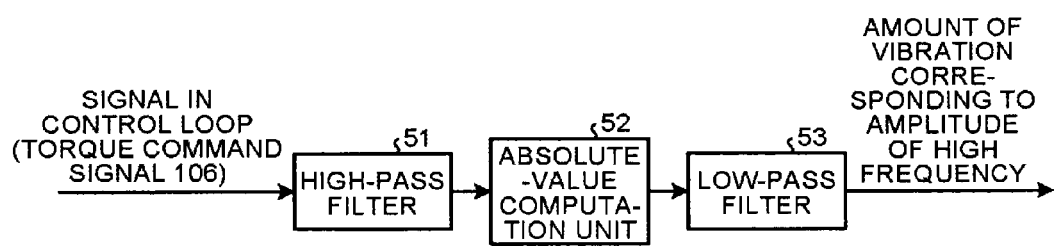
FIG. 2 is a block diagram of an oscillation detection unit according to the first embodiment.

FIG. 2 is a block diagram illustrating the oscillation detection unit 42 illustrated in FIG. 1. The oscillation detection unit 42 receives a signal in a control loop (in FIG. 1, the torque command signal 106) as an input signal. The input signal passes through a high-pass filter 51. The passband of the high-pass filter 51 is set to a frequency band near a frequency of the high-frequency vibration to be detected. As a control signal passes through the high-pass filter 51, only high-frequency vibration in the control signal is extracted. The signal having passed through the high-pass filter 51 then passes through an absolute-value computation unit 52 and a low-pass filter 53, and thus an amount of vibration corresponding to an amplitude of a frequency equal to or higher than a predetermined frequency can be detected. While FIG. 2 exemplifies a case of detecting an oscillation amount of the torque command signal 106, an oscillation amount of a current signal, a speed detection signal, a pressure detection signal, or the like may be detected. The overshoot-amount detection unit 43 detects an overshoot amount.

Figure 3:
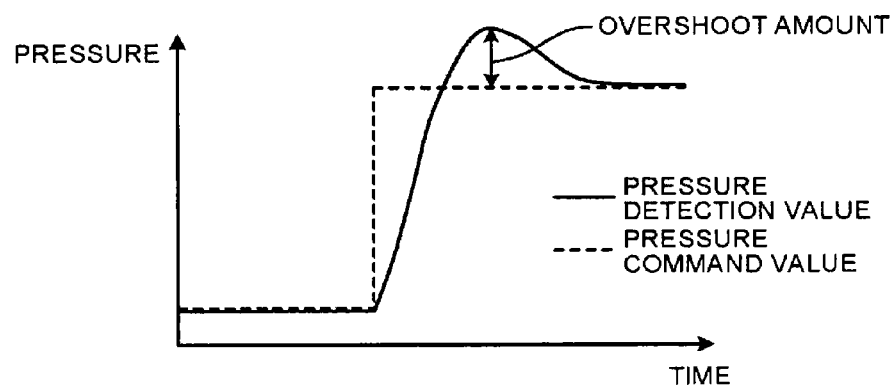
FIG. 3 is a diagram illustrating a temporal change in the value of a pressure command signal and the value of a pressure detection signal according to the first embodiment.

FIG. 3 is a diagram illustrating a temporal change in the value of a pressure command signal and the value of a pressure detection signal. A loop is formed such that the pressure detection signal 109 follows the pressure command signal 100, and thus if a control parameter that may exceed a stability limit is not set, in a steady state, a pressure detector can follow a pressure command signal having a fixed value without any deviation. However, in a transient state, the value of the pressure detection signal exceeds the value of the pressure command signal (see FIG. 3), and overshoot is generated. An overshoot amount is calculated by using the maximum value of a positive deviation between the value of the pressure detection signal and the value of the pressure command signal.

Figure 4:
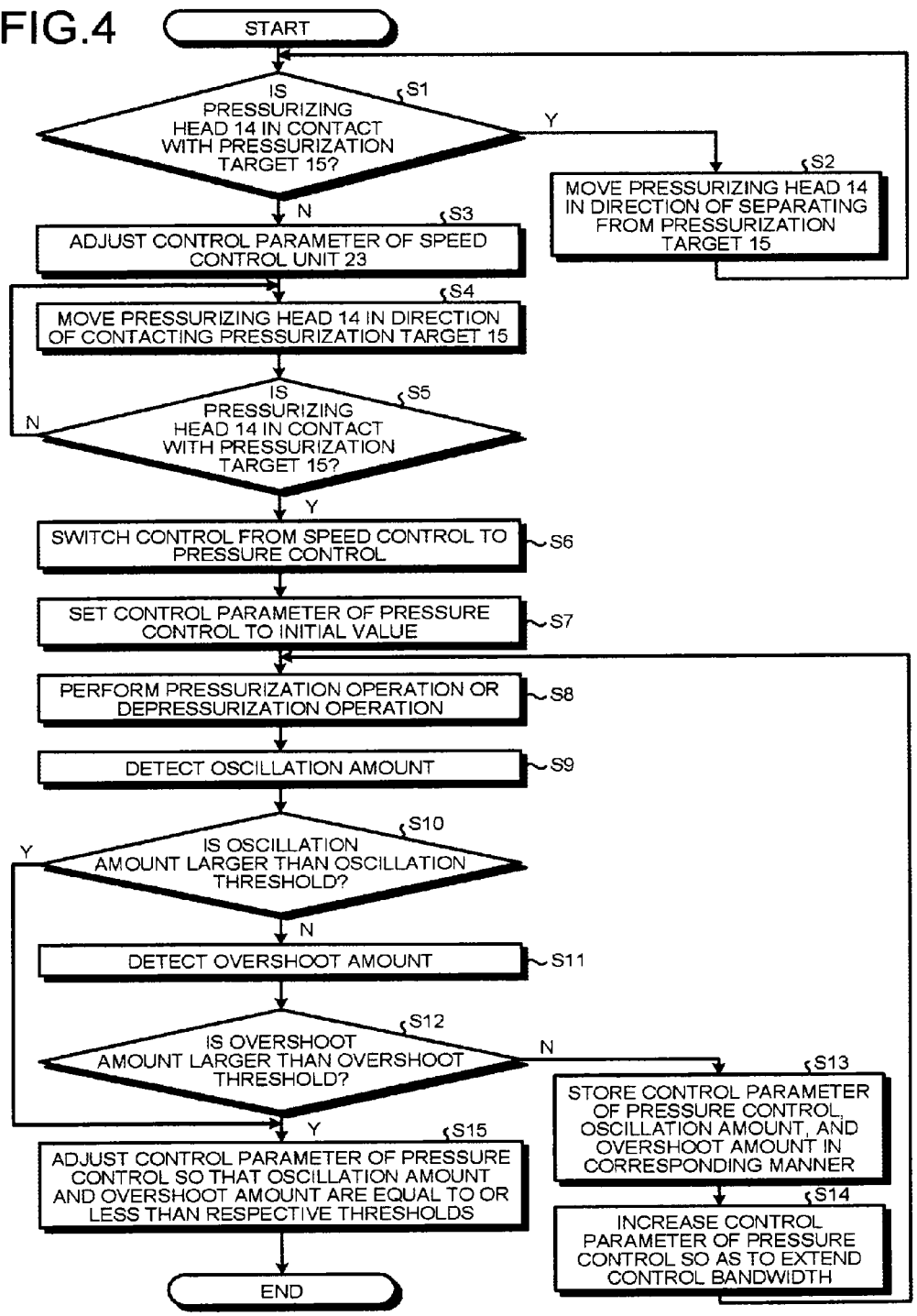
FIG. 4 is a flowchart illustrating a process performed by a pressure-control-unit parameter adjustment unit according to the first embodiment.

FIG. 4 is a flowchart illustrating a process performed by the pressure-control-unit parameter adjustment unit 41. A case where the pressure control unit 21 executes proportional control is described below.

It is determined first whether the pressurizing head 14 is in contact with the pressurization target 15 (Step S1). Whether the pressurizing head 14 is in contact with the pressurization target 15 may be determined by using a value of the pressure detection signal 109 from the pressure detector 16. If the value of the pressure detection signal 109 is larger than 0, it is determined that the pressurizing head 14 is in contact with the pressurization target 15. If the value is 0, it is determined that the pressurizing head 14 is not in contact with the pressurization target 15.

If it is determined that the pressurizing head 14 is in contact with the pressurization target 15 (branches to Y), the process proceeds to Step S2, and the pressurizing head 14 is moved in a direction in which it separates from the pressurization target 15 (Step S2). Specifically, the external speed-command signal generation unit 30 transmits the external speed-command signal 103 to move the pressurizing head 14 in a direction of not being in contact with the pressurization target 15, and the speed-command selection unit 22 selects the external speed-command signal 103. For example, the direction of moving the pressurizing head 14 so as not to be in contact with the pressurization target 15 is the direction toward the left in FIG. 1.

If it is determined that the pressurizing head 14 is not in contact with the pressurization target 15 (branches to N), the process proceeds to Step S3, and the control parameter of the speed control unit 23 serving as a minor loop of the pressure control unit 21 is adjusted (Step S3). A case of adjusting the control parameter of the speed control unit 23 with proportional integral control as exemplified above is described with reference to FIG. 5.

Figure 5:
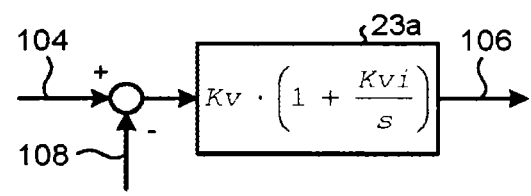
FIG. 5 is an extracted diagram illustrating the vicinity of a speed control unit that executes proportional integral control on the speed control unit according to the first embodiment.

FIG. 5 is an extracted diagram of a dot-line rectangular area of FIG. 1 in a case where a speed control unit 23a that executes proportional integral control is applied to the speed control unit 23. In FIG. 5, Kv and Kvi are control parameters of the speed control unit 23. Kv denotes a speed proportional gain and Kvi denotes a speed integral gain. "s" denotes a Laplace operator and 1/s represents integral characteristics. Transmission characteristics from a torque command to the speed can be represented as $1/(J \cdot s)$, where "J" denotes an inertia value of a movable part which is, in FIG. 1, an inertia value of a part that is operated by the driver of the motor 11. This inertia value corresponds to the total inertia of motor inertia and inertia of the ball screw 13, the pressurizing head 14, and a load cell. Generally, at the design stage, the inertia value J of the movable part is known from specification values of the ball screw 13, the pressurizing head 14, and the like.

To obtain a stable response of a speed control loop, it is known that the ratio between the speed proportional gain Kv and the speed integral gain Kvi is preferably Kv:Kvi: Kp=10J:1-4. Accordingly, if the following are done, a stable response in the speed control loop will be obtained: the speed proportional gain Kv is gradually increased; the speed integral gain Kvi is set correspondingly so; a step signal, a ramp signal, and the like are applied as the speed command signal 104 such that the pressurizing head 14 is operated in a state of not being in contact with the pressurization target 15; and the speed proportional gain Kv and the speed integral gain Kvi are adjusted such that overshoot and vibration are not generated. As long as the control parameter of the speed control unit 23 is adjusted in a state where the pressurizing head 14 is not in contact with the pressurization target 15, the adjustment is not limited thereto.

When the adjustment of the control parameter of the speed control unit 23 is completed, the pressurizing head 14 is moved in a direction in which it makes contact with the pressurization target 15 (Step S4). Specifically, the external speed-command signal generation unit 30 transmits the external speed-command signal 103 to move the pressurizing head 14 in the direction where it makes contact with the pressurization target 15, and the speed-command selection unit 22 selects the external speed-command signal 103. For example, the direction of moving the pressurizing head 14 so as to make contact with the pressurization target 15 is in the direction to the right in FIG. 1. The pressurizing head 14 is preferably moved at a speed that is not higher than a speed at which the pressurizing head 14 would hit the pressurization target 15 hard and the pressurizing head 14 or the pressurization target 15 be damaged.

Next, it is determined whether the pressurizing head 14 is in contact with the pressurization target 15 (Step S5). The determination may be performed similarly to Step S1.

If it is determined that the pressurizing head 14 is not in contact with the pressurization target 15 (branches to N), the process proceeds to Step S4, and the pressurizing head 14 is moved in the direction of making contact with the pressurization target 15 (Step S4).

If it is determined that the pressurizing head 14 is in contact with the pressurization target 15 (branches to Y), the process proceeds to Step S6 and an operation is switched from a speed control operation to a pressure control operation (Step S6). That is, the speed-command selection unit 22 switches from the external speed-command signal 103 to the internal speed-command signal 102.

Next, a control parameter of pressure control is set to an initial value (Step S1). That is, a proportional gain that is the control parameter of the pressure control unit 21 is set to an initial value. As the initial value, a value at which oscillation and overshoot are difficult to be generated (for example, a lower limit value that can be set as the proportional gain) is used.

Figure 6:
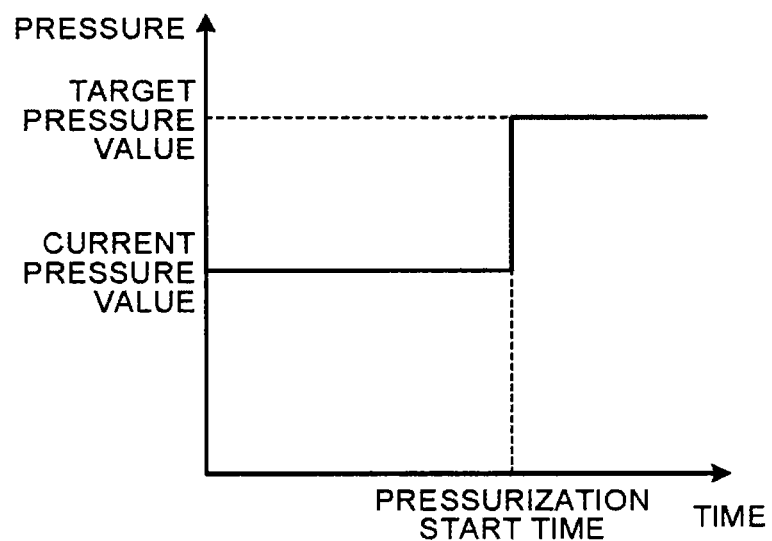
FIG. 6 is a diagram illustrating a temporal change in the value of a pressure command signal during a pressurization operation according to the first embodiment.

Next, a pressurization operation or a depressurization operation is performed (Step S8). In the pressurization operation, the pressure-command signal generation unit 40 sets a value of the pressure command signal 100 such that the pressure is larger than the current value of the pressure detection signal 109 detected by the pressure detector 16. FIG. 6 is a diagram illustrating a temporal change in the value of a pressure command signal during the pressurization operation.

Figure 7:
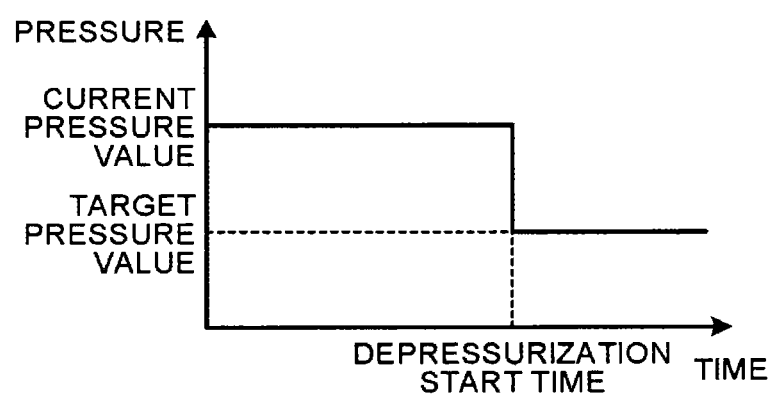
FIG. 7 is a diagram illustrating a temporal change in the value of a pressure command signal during a depressurization operation according to the first embodiment.

At the depressurization operation, the pressure-command signal generation unit 40 sets a value of the pressure command signal 100 such that the pressure is smaller than a current value of the pressure detection signal 109 detected by the pressure detector 16. FIG. 7 is a diagram illustrating a temporal change in a value of a pressure command signal during the depressurization operation.

Note that FIGS. 6 and 7 illustrate a mode in which the value of the pressure command signal is changed stepwise from the current pressure value to the target pressure value; however, the present invention is not limited thereto. The value of the pressure command signal may be changed in a ramp-shape manner to the target pressure value. That is, it is permissible that the value of the pressure command signal is changed as a linear function of time during which the value of the pressure command signal is changed from the current pressure value to the target pressure value, and after reaching the target pressure value, it is changed to maintain the target pressure value. Alternatively, other high-order polynomial expressions relating to the time, trigonometric functions, and the like may be used.

Next, the oscillation detection unit 42 detects an oscillation amount during the pressurization operation or the depressurization operation (Step S9).

Next, it is determined whether the oscillation amount detected by the oscillation detection unit 42 exceeds an oscillation threshold (Step S10). If it is determined that the oscillation amount exceeds the oscillation threshold (branches to Y), the process proceeds to Step S15. If it is determined that the oscillation amount does not exceed the oscillation threshold (branches to N), the process proceeds to Step S11, and the overshoot-amount detection unit 43 detects an overshoot amount (Step S11). The oscillation threshold is an upper limit value of an acceptable oscillation amount that is set in advance.

At Step S11, when the overshoot-amount detection unit 43 detects the overshoot amount, it is determined whether the overshoot amount detected by the overshoot-amount detection unit 43 exceeds an overshoot threshold (Step S12). If it is determined that the overshoot amount exceeds the overshoot threshold (branches to Y), the process proceeds to Step S15. If it is determined that the overshoot amount does not exceed the overshoot threshold (branches to N), the process proceeds to Step S13. The overshoot threshold is an upper limit value of an acceptable overshoot amount that is set in advance.

If the oscillation amount does not exceed the oscillation threshold and the overshoot amount does not exceed the overshoot threshold, the control parameter of the pressure control, the oscillation amount, and the overshoot amount are stored in an associated manner (Step S13). The control parameter of the pressure control is then changed so as to extend a control bandwidth (Step S14). For example, when the pressure control unit 21 executes the proportional control, the proportional gain is increased.

For example, the proportional gain may be increased by using a proportional gain value that is 1.1 times the current proportional gain value as a new proportional gain value.

In a case of extending the control bandwidth, when the proportional gain of the pressure control unit 21 is set by the reciprocal of a control parameter Ta, the control parameter Ta is changed to be reduced, and thus a control parameter that can extend the control bandwidth can be obtained.

After changing the control parameter of the pressure control so as to extend the control bandwidth, the process proceeds to Step S8, and the processes described above may be repeated again from the pressurization operation or the depressurization operation.

Furthermore, if the oscillation amount exceeds the oscillation threshold or if the overshoot amount exceeds the overshoot threshold as described above, the process proceeds to Step S15. The control parameter is then adjusted such that both the oscillation amount and the overshoot amount are equal to or less than their respective thresholds (Step S15). Specifically, the control parameter is adjusted as follows. For example, it is permissible to select a control parameter immediately before either the oscillation amount or the overshoot amount exceeds its threshold, where the oscillation amount and the overshoot amount are stored during the pressurization operation or the depressurization operation when the control parameter of the pressure control unit 21 is changed over Steps S8 to S14. This control parameter is referred to as "first control parameter". Alternatively, it is permissible to select a control parameter not immediately before but earlier than immediately before either the oscillation amount or the overshoot amount exceeds a threshold. Such a control parameter is referred to as "second control parameter". Alternatively, an intermediate value of the first control parameter and the second control parameter may be selected. In this way, the control parameter may be set while securing a margin.

The processing then ends. The pressure-control-unit parameter adjustment unit 41 performs the processes as described above with reference to FIG. 4, and thus an appropriate control parameter used for the pressure control can be obtained.

As described over Steps S7 to S15, according to the present embodiment, a pressurization operation or a depressurization operation is repeated in a state where the pressurizing head 14 is in contact with the pressurization target 15; a control parameter (a pressure proportional gain) of pressure control is gradually changed such that the control bandwidth is gradually extended; at least one of an oscillation amount and an overshoot amount in an actual control loop is detected; the setting of the control parameter of the pressure control when the oscillation amount or the overshoot amount exceeds a thresholds is ascertained in practice; and on the basis of information on the setting, a control parameter that does not allow the oscillation amount or the overshoot amount to exceed their thresholds is selected, so the control parameter is adjusted. As the control parameter is adjusted as described above, pressure control can be executed so that the oscillation amount and the overshoot amount never exceed their respective thresholds. The control parameter is adjusted while an operation is performed in practice, and thus it is possible to quickly obtain an appropriate control parameter without trial and error procedures.

Over Steps S1 to S3, a control parameter of speed control that is a minor loop of pressure control is adjusted before a control parameter of the pressure control unit 21 is adjusted in a state where the pressurizing head 14 is not in contact with the pressurization target 15. Therefore, even when an operation of moving the pressurizing head 14 to approach the pressurization target 15 is performed in the speed control, overshoot and vibration are not generated in the speed.

The control performance of the pressure control (pressure vibration, overshoot, and a quickness of response) is affected by not only the control parameter of the pressure control but also the control parameter of the speed control that is a minor loop of the pressure control. After the pressurizing head 14 contacts the pressurization target 15, the control parameter of the speed control is fixed to be in a state before the pressurizing head 14 contacts the pressurization target 15, the overshoot and oscillation in the pressure control are detected, and the control parameter of the pressure control is adjusted such that the overshoot and the oscillation (vibration) are equal to or less than respective acceptable thresholds. Accordingly, it is possible to prevent speed overshoot and speed oscillation (vibration) in an operation before the pressurizing head 14 contacts the pressurization target 15 (the speed control operation), and even when the pressurizing head 14 contacts the pressurization target 15, the pressure control can be executed without generating any overshoot or oscillation (vibration).

The above description is an example of adjusting the control parameter of the speed control unit 23 while keeping the ratio of the speed proportional gain Kv and the speed integral gain Kvi.

As a comparative example, descriptions will be given of a case where, when a control parameter of the pressure control unit 21 is adjusted, the ratio of the control parameter of the speed control unit 23 and the control parameter of the pressure control unit 21 is set; both the control parameter of the speed control unit 23 and the control parameter of the pressure control unit 21 are gradually increased while the ratio is fixed; an oscillation amount and an overshoot amount are detected; and the control parameter of the speed control unit 23 and the control parameter of the pressure control unit 21 are simultaneously adjusted.

For example, in a case where the speed control unit 23 executes proportional integral control, a control parameter thereof is constituted by the speed proportional gain Kv and the speed integral gain Kvi, and the pressure control unit 21 executes proportional control with a pressure proportional gain Ka, it is permissible that the ratio such as Kv:Kvi: Ka=J:0.25:3 is determined in advance. The control parameter is gradually increased under the condition where if it is given that Ka=300, then Kv=100J and Kvi=25, and under another condition where if it is given that Ka=600, then Kv=200J and Kvi=50; then every time the control parameter is increased, the oscillation amount and the over shoot amount are detected; and the control parameters of the pressure control and the speed control can be adjusted at a single time.

In this comparative example also, as is described in the present embodiment, with respect to the control parameter of the speed control unit 23 (the speed proportional gain Kv and the speed integral gain Kvi), transmission characteristics from the torque command signal 106 of the speed control unit 23 to the speed is $1/(J \cdot s)$, and thus the ratio of multiple control parameters to each other can be determined appropriately. However, transmission characteristics from a speed signal to the pressure cannot be determined when information such as the elastic constant of the pressurization target 15 is unknown.

Accordingly, if the information such as the elastic constant is unknown, the ratio of the control parameter of the pressure control and the control parameter of the speed control cannot be determined appropriately. Because the ratio of the control parameter of the pressure control and the control parameter of the speed control cannot be determined appropriately as described above, if the ratio of the control parameter of the pressure control and the control parameter of the speed control is fixed and then the parameter of the pressure control is to be adjusted, oscillation overshoot is generated in the pressure control.

As described above, the motor control device according to the present embodiment is the motor control device 10 that includes the motor 11; a speed detection unit (the encoder 12) that detects or estimates the speed of the motor 11; a mechanical drive unit (the ball screw 13) that drives a mechanical load (the pressurizing head 14) by an operation of the motor 11; the pressure detector 16 that detects, as the pressure detection signal 109, information on pressure or force when the mechanical load (the pressurizing head 14) is pressed against the pressurization target 15; the pressure control unit 21 that calculates the internal speed-command signal 102 of the motor 11 on the basis of a pressure control parameter such that the pressure detection signal 109 follows the pressure command signal 100; and the speed control unit 23 that calculates the torque command signal 106 or a force command signal for the motor 11 on the basis of a speed control parameter such that the speed detection signal 108 follows the speed command signal 104 that is either one of the internal speed-command signal 102 and the external speed-command signal 103. The motor control device 10 is a motor control device with features that include the oscillation detection unit 42 that detects an oscillation of a control state quantity and the pressure-control-unit parameter adjustment unit 41. With the pressure-control-unit parameter adjustment unit 41, in a state of pressing the mechanical load (the pressurizing head 14) against the pressurization target 15, only a pressure control parameter of the pressure control unit 21 is changed while a speed control parameter of the speed control unit 23 is fixed; the pressure control parameter is changed from a control parameter setting with a narrow control bandwidth of the pressure control unit 21 so as to extend the control bandwidth of the pressure control unit 21; and when the oscillation detection unit 42 detects oscillation, the control parameter of the pressure control unit 21 is adjusted such that the control bandwidth of the pressure control unit 21 is narrower than that with a control parameter of the pressure control unit 21 during the detecting of the oscillation.

Alternatively, the motor control device according to the present embodiment is the motor control device 10 that includes the motor 11; the speed detection unit (the encoder 12) that detects or estimates the speed of the motor 11; the mechanical drive unit (the ball screw 13) that drives the mechanical load (the pressurizing head 14) by an operation of the motor 11; the pressure detector 16 that detects information on pressure or force when the mechanical load (the pressurizing head 14) is pressed against the pressurization target 15 as the pressure detection signal 109; the pressure control unit 21 that calculates the internal speed-command signal 102 of the motor 11 on the basis of a pressure control parameter such that the pressure detection signal 109 follows the pressure command signal 100; and the speed control unit 23 that calculates the torque command signal 106 or a force command signal for the motor 11 on the basis of a speed control parameter such that the speed detection signal 108 follows the speed command signal 104 that is either one of the internal speed-command signal 102 and the external speed-command signal 103. The motor control device 10 is a motor control device with features that include the overshoot-amount detection unit 43 that detects an overshoot amount from a target value response and the pressure-control-unit parameter adjustment unit 41. With the pressure-control-unit parameter adjustment unit 41, in which in a state of pressing the mechanical load (the pressurizing head 14) against the pressurization target 15, only a pressure control parameter of the pressure control unit 21 is changed while a speed control parameter of the speed control unit 23 is fixed, the pressure control parameter is changed from a control parameter setting with a narrow control bandwidth of the pressure control unit 21 so as to extend the control bandwidth of the pressure control unit 21, and the control parameter of the pressure control unit 21 is adjusted such that the control bandwidth of the pressure control unit 21 is narrower than that with a control parameter of the pressure control unit 21 when an overshoot amount detected by the overshoot-amount detection unit 43 exceeds an overshoot threshold.

According to the present embodiment, even if the characteristics of a pressurization target are unknown, a control parameter during pressure control can still be adjusted so that oscillation or excessive overshoot is not generated. The control parameter of the pressure control and the control parameter of the speed control, which is a minor loop of the pressure control, are adjusted not in an associated manner but individually. Therefore, in an operation in which the mechanical load approaches the pressurization target (in a state where the mechanical load is not in contact with the pressurization, target), it is possible to implement control that prevents generation of overshoot and oscillation in the speed. Further, in an operation in which the mechanical load pressurizes the pressurization target (in a state where the mechanical load is in contact with the pressurization target), it is possible to implement pressure control that prevents generation of oscillation. While the present embodiment has described an example of detecting both an oscillation amount and an overshoot amount and adjusting the control parameter of the pressure control such that the oscillation amount and the overshoot amount are less than their respective thresholds, note that it is permissible to detect only the oscillation amount and adjust the control parameter of the pressure control such that only the oscillation amount is less than the its threshold. Alternatively, it is permissible to detect only the overshoot amount and adjust the control parameter of the pressure control such that only the overshoot amount is less than the its threshold. When only the oscillation amount is detected, it is possible to adjust the control parameter of the pressure control to make the oscillation amount less than a predetermined value. When only the overshoot amount is detected, it is possible to adjust a control parameter of the pressure control that makes the overshoot amount less than a predetermined value.

Second Embodiment

While the first embodiment has described a mode in which the minor loop in pressure control is speed control, the present invention is not limited thereto. The present embodiment describes a mode in which a minor loop in the pressure control is position control.

Figure 8:
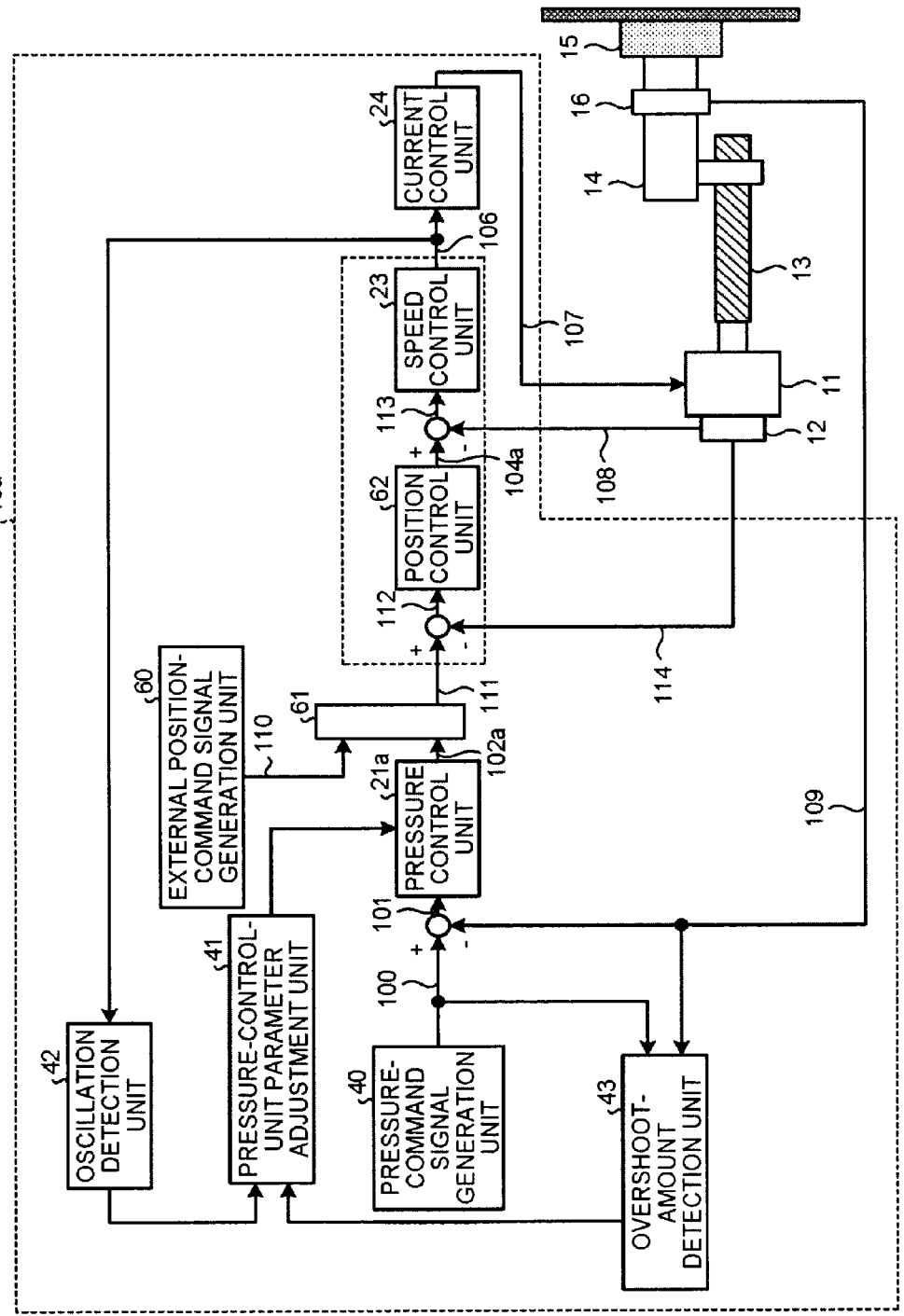
FIG. 8 is a block diagram illustrating a configuration of a motor control device according to a second embodiment.

FIG. 8 is a block diagram illustrating a configuration of a motor control device according to a second embodiment of the present invention. In a motor control device 10a illustrated in FIG. 8, the external speed-command signal generation unit 30 of the motor control device 10 illustrated in FIG. 1 is replaced by an external position-command signal generation unit 60; a position control unit 62 is provided; and the speed-command selection unit 22 of the motor control device 10 is replaced by a position-command selection unit 61.

In the motor control device 10a illustrated in FIG. 8, a process of generating the current 107 that is supplied from the current control unit 24 and drives the motor 11 is as follows. In the motor control device 10a illustrated in FIG. 8, the method of calculating the current 107 for driving the motor 11 is different from that of the first embodiment.

First, the pressure-command signal generation unit 40 generates the pressure command signal 100 and outputs the generated pressure command signal 100.

A pressure control unit 21a receives, as an input signal, the signal 101, which corresponds to the deviation (difference) between the pressure command signal 100 from the pressure-command signal generation unit 40 and the pressure detection signal 109 from the pressure detector 16. The pressure control unit 21a performs pressure control computation and calculates a command value of an internal position-command signal 102a corresponding to the deviation between the command value of the pressure command signal 100 and the detection value of the pressure detection signal 109.

As is the case in the first embodiment, an example of the pressure control computation performed by the pressure control unit 21a is proportional control.

The external position-command signal generation unit 60 generates an external position-command signal 110 that indicates the position at which the motor 11 should be operated regardless of the output signal of the pressure control unit 21a.

The value of the external position-command signal 110 is set at a command value that causes the pressurizing head 14 to approach the pressurization target 15 that is not in contact with the pressurizing head 14.

The position-command selection unit 61 selects either one of the internal position-command signal 102*a* and the external position-command signal 110 and outputs the selected signal as a position command signal 111.

The position control unit 62 receives a signal 112 corresponding to the deviation (difference) between the position command signal 111 from the position-command selection unit 61 and a current position signal 114 from the encoder 12 as an input signal. The position control unit 62 performs position control computation on the basis of the deviation (difference) between the value of the position command signal 111 from the position-command selection unit 61 and the value of the current position signal 114 and outputs a speed command signal 104*a*.

An example of a configuration of the position control unit 62 is a configuration of multiplying an input deviation (an input difference) by a position proportional gain acting as a control parameter and thus outputting the speed command signal 104*a*.

The speed control unit 23 receives a signal 113 corresponding to the deviation (difference) between the value of the speed command signal 104*a* and the value of the speed detection signal 108 as an input signal. The speed control unit 23 performs speed control computation on the basis of the deviation (difference) between the value of the speed command signal 104*a* and the value of the speed detection signal 108; calculates the torque command signal 106 for calculating a torque to be generated by the motor 11 or a force command signal; and outputs the calculated signal.

An example of the speed control computation performed by the speed control unit 23 is proportional integral control. In this case, the speed proportional gain and the speed integral gain are the control parameters of the speed control unit 23.

The current control unit 24 receives the torque command signal 106 or a force command signal from the speed control unit 23 as an input signal. The current control unit 24 supplies the current 107 for generating a torque corresponding to the torque command signal 106 or the force command signal to the motor 11. The motor 11 is thus driven, the pressure applied to the pressurization target 15 is detected by the pressure detector 16, and pressure control is executed so that the pressure follows a pressure command value.

Other configurations are identical to those of FIG. 1 according to the first embodiment.

Figure 9:
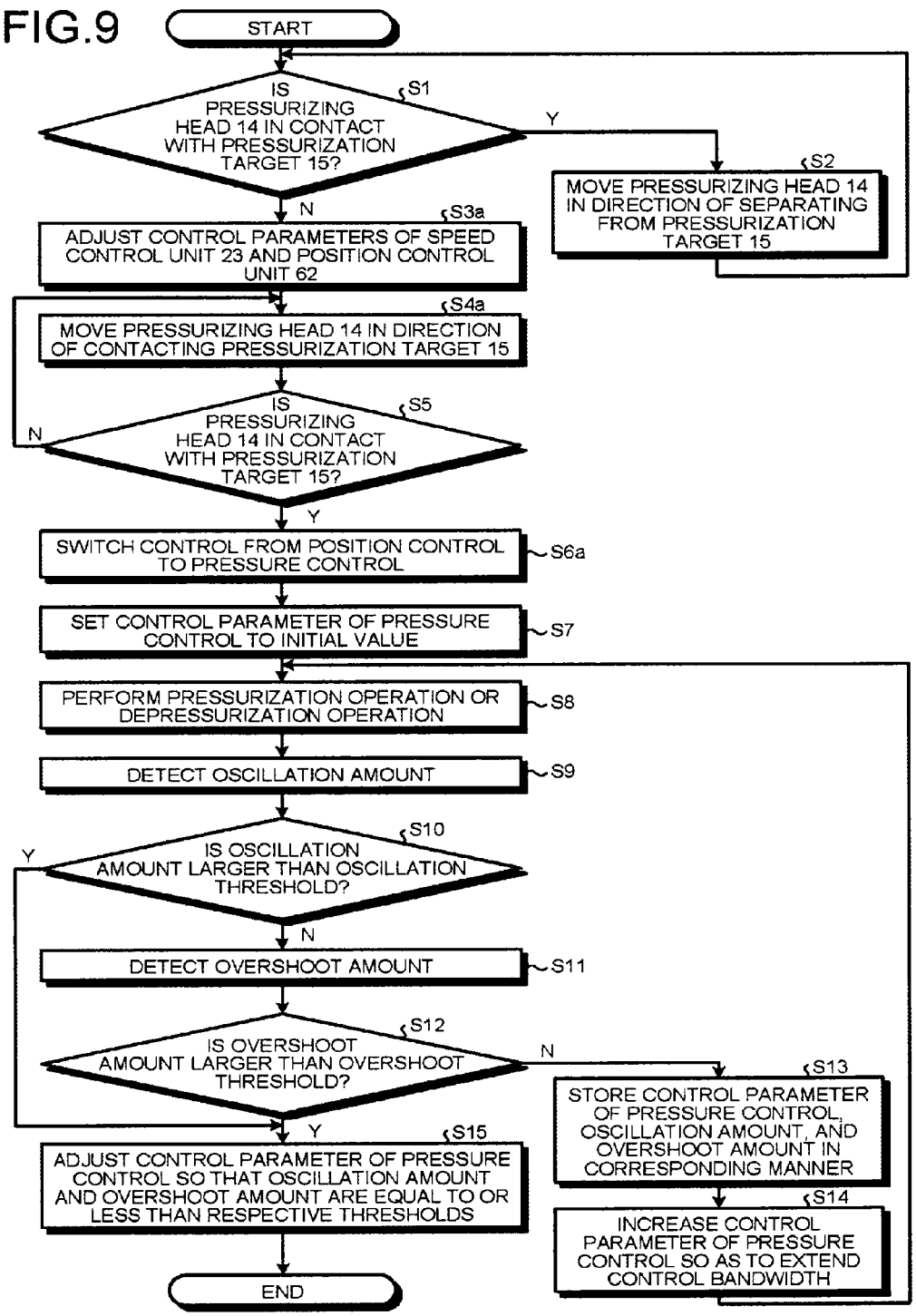
FIG. 9 is a flowchart illustrating a process performed by a pressure-control-unit parameter adjustment unit according to the second embodiment.

FIG. 9 is a flowchart illustrating a process performed by the pressure-control-unit parameter adjustment unit 41. Processes identical to those of FIG. 4 are denoted by like step numbers. Descriptions of parts that are identical to those of FIG. 4 will be omitted.

As is the case in the first embodiment, it is determined first whether the pressurizing head 14 is in contact with the pressurization target 15 (Step S1).

If it is determined that the pressurizing head 14 is in contact with the pressurization target 15 (branches to Y), the process proceeds to Step 32, and the pressurizing head 14 is moved in a direction in which it is separated from the pressurization target 15 (Step S2). Specifically, the external position-command signal generation unit 60 transmits the external position-command signal 110 to move the pressurizing head 14 in a direction in which it is not in contact with the pressurization target 15, and the position-command selection unit 61 selects the external position-command signal 110. For example, the direction in which the pressurizing head 14 moves so as not to be in contact the pressurization target 15 is to the left in FIG. 8.

If it is determined that the pressurizing head 14 is not in contact with the pressurization target 15 (branches to N), the process proceeds to Step S3*a*; and the control parameters of the position control unit 63 and the speed control unit 23 that act as a minor loop in the pressure control unit 21*a* are respectively adjusted (Step S3*a*). Adjustment of the control parameters of the speed control unit 23 and the position control unit 62 is described with reference to FIG. 10.

Figure 10:
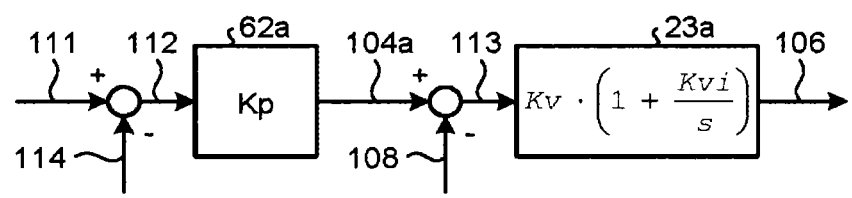
FIG. 10 is an extracted diagram illustrating the vicinity of a speed control unit that executes proportional integral control on a speed control unit and a position control unit according to the second embodiment.

FIG. 10 is an extracted diagram of a dot-line rectangular area of FIG. 8 in a case where the speed control unit 23*a* that executes proportional integral control is applied to the speed control unit 23 and a position control unit 62*a* that executes proportional control is applied to the position control unit 62. As is the case in the first embodiment, Kv and Kvi are control parameters of the speed control unit 23. Kv denotes a speed proportional gain and Kvi denotes a speed integral gain. "s" denotes a Laplace operator and 1/s represents integral characteristics. Transmission characteristics from a torque command to the speed can be represented as $1/(J\cdot s)$ and transmission characteristics from the speed to the position can be represented as 1/s. As is the case in the first embodiment, "J" denotes an inertia value of a movable part. Here, Kp is a position proportional gain.

To obtain a stable response in the position and speed control loop, it is known that the ratio of the speed proportional gain Kv, the speed integral gain Kvi, and the position proportional gain Kp to each other preferably satisfies the following: Kv:Kvi:Kp=10J:1-4:1-4. Accordingly, if the following is done a stable response in the speed control loop will be obtained: the speed proportional gain Kv is gradually increased; the speed integral gain Kvi and the position proportional gain Kp are set correspondingly; a step signal, a ramp signal and the like are applied as the speed command signal 104*a* such that the pressurizing head 14 is operated in a state of not making contact with the pressurization target 15; and the speed proportional gain Kv, the speed integral gain Kvi, and the position proportional gain Kp are adjusted so that the overshoot and vibration are not generated. As long as the control parameters of the position control unit 62 and the speed control unit 23 are preferably adjusted in a state where the pressurizing head 14 is not in contact with the pressurization target 15, the adjustment is not limited thereto.

When the adjustment of the control parameter of the speed control unit 23 is completed, the pressurizing head 14 is moved in a direction to make contact with the pressurization target 15 (Step S4*a*). Specifically, the external position-command signal generation unit 60 transmits the external position-command signal 110 as a position where the pressurizing head 14 makes contact with the pressurization target 15, and the position-command selection unit 61 selects the external position-command signal 110.

Next, it is determined whether the pressurizing head 14 is in contact with the pressurization target 15 (Step S5). This determination may be performed similarly to Step S1.

If it is determined that the pressurizing head 14 is not in contact with the pressurization target 15 (branches to N), the process proceeds to Step S4*a*, and the pressurizing head 14 is moved in the direction of in which it makes contact with the pressurization target 15 (Step S4*a*).

If it is determined that the pressurizing head 14 is in contact with the pressurization target 15 (branches to Y), the process proceeds to Step S6*a* and an operation is switched from a position control operation to a pressure control operation (Step S6*a*). That is, the position-command selection unit 61 switches from the external position-command signal 110 to the internal position-command signal 102*a*.

Next, as is the case in the first embodiment, a control parameter of pressure control is set to an initial value (Step S7). That is, a proportional gain that is the control parameter of the pressure control unit 21*a* is set to an initial value.

Next, as is the case in the first embodiment, a pressurization operation or a depressurization operation is performed (Step S8).

Next, as is the case in the first embodiment, the oscillation detection unit 42 detects an oscillation amount during the pressurization operation or the depressurization operation (Step S9).

Next, as is the case in the first embodiment, it is determined whether the oscillation amount detected by the oscillation detection unit 42 exceeds an oscillation threshold (Step S10). As is the case in the first embodiment, if it is determined that the oscillation amount exceeds the oscillation threshold (branches to Y), the process proceeds to Step S15. If it is determined that the oscillation amount does not exceed the oscillation threshold (branches to N), the process proceeds to Step S11, and the overshoot-amount detection unit 43 detects an overshoot amount (Step S11). The oscillation threshold is an upper limit value of an acceptable oscillation amount that is set in advance.

As is the case in the first embodiment, at Step S11, when the overshoot-amount detection unit 43 detects the overshoot amount, it is determined whether the overshoot amount detected by the overshoot-amount detection unit 43 exceeds an overshoot threshold (Step S12).

As is the case in the first embodiment, if it is determined that the overshoot amount exceeds the overshoot threshold (branches to Y), the process proceeds to Step S15. If it is determined that the overshoot amount does not exceed the overshoot threshold (branches to N), the process proceeds to Step S13.

As is the case in the first embodiment, if the oscillation amount does not exceed the oscillation threshold and the overshoot amount does not exceed the overshoot threshold, the control parameter of the pressure control, the oscillation amount, and the overshoot amount are stored in an associated manner (Step S13). As is the case in the first embodiment, the control parameter of the pressure control is then changed so as to extend the control bandwidth (Step S14). For example, when the pressure control unit 21*a* executes the proportional control, the proportional gain is increased.

As is the case in the first embodiment, after changing the control parameter of the pressure control so as to extend the control bandwidth, the process proceeds to Step S8, and the processes described above may be repeated again from the pressurization operation or the depressurization operation.

As is the case in the first embodiment, if the oscillation amount exceeds the oscillation threshold or if the overshoot amount exceeds the overshoot threshold, as described above, the process proceeds to Step S15. The control parameter is then adjusted so that both the oscillation amount and the overshoot amount are equal to or less than their respective thresholds (Step S15).

The processing then ends. The pressure-control-unit parameter adjustment unit 41 performs the processes as described above with reference to FIG. 9, and thus an appropriate control parameter used for the pressure control can be obtained.

As described over Steps S7 to S15, according to the present embodiment, a pressurization operation or a depressurization operation is repeated in a state where the pressurizing head 14 is in contact with the pressurization target 15; a control parameter (a pressure proportional gain) of pressure control is gradually changed such that the control bandwidth is gradually extended; at least one of an oscillation amount and an overshoot amount in an actual control loop is detected; the setting of the control parameter of the pressure control when the oscillation amount or the overshoot amount exceeds a threshold is ascertained in practice; and on the basis of information on the setting, a control parameter that does not allow the oscillation amount or the overshoot amount to exceed a threshold is selected, and therefore the control parameter is adjusted. As the control parameter is adjusted as described above, the pressure control can be executed such that the oscillation amount and the overshoot amount never exceed the respective thresholds. Further, on the basis of a pressure command signal having an increasing or decreasing pressure value, the control parameter is adjusted while an operation is performed in practice and thus it is possible to quickly obtain an appropriate control parameter without trial and error.

As described above, the motor control device according to the present embodiment is the motor control device 10*a* that includes the motor 11; a speed detection unit (the encoder 12) that detects or estimates the speed of the motor 11; a mechanical drive unit (the ball screw 13) that drives a mechanical load (the pressurizing head 14) by an operation of the motor 11; the pressure detector 16 that detects information on pressure or force when the mechanical load (the pressurizing head 14) is pressed against the pressurization target 15 as the pressure detection signal 109; the pressure control unit 21*a* that calculates the internal position-command signal 102*a* of the motor 11 on the basis of a pressure control parameter such that the pressure detection signal 109 follows the pressure command signal 100; the position control unit 62 that calculates the speed command signal 104*a* of the motor 11 on the basis of a position control parameter such that the current position signal 114 follows the position command signal 111 that is either one of the internal position-command signal 102*a* and the external position-command signal 110; and the speed control unit 23 that calculates the torque command signal 106 or a force command signal for the motor 11 on the basis of a speed control parameter such that the speed detection signal 108 follows the speed command signal 104*a*. The motor control device 10*a* is a motor control device that has features including the oscillation detection unit 42 that detects an oscillation of control state quantity and the pressure-control-unit parameter adjustment unit 41. The pressure-control-unit parameter adjustment unit 41 in which, in a state of pressing the mechanical load (the pressurizing head 14) against the pressurization target 15, only a pressure control parameter of the pressure control unit 21*a* is changed while a position control parameter of the position control unit 62 and a speed control parameter of the speed control unit 23 are fixed; the pressure control parameter is changed from a control parameter setting with a narrow control bandwidth of the pressure control unit 21*a* so as to extend the control bandwidth of the pressure control unit 21*a*; and when the oscillation detection unit 42 detects oscillation, the control parameter of the pressure control unit 21*a* is adjusted such that the control bandwidth of the pressure control unit 21*a* is narrower than that with a control parameter of the pressure control unit 21*a* during detection of the oscillation.

Alternatively, the motor control device according to the present embodiment is the motor control device 10*a* that includes the following: the motor 11; the speed detection unit (the encoder 12) that detects or estimates the speed of the motor 11; the mechanical drive unit (the ball screw 13)

that drives the mechanical load (the pressurizing head 14) by an operation of the motor 11; the pressure detector 16 that detects information on pressure or force when the mechanical load (the pressurizing head 14) is pressed against the pressurization target 15 as the pressure detection signal 109; the pressure control unit 21a that calculates the internal position-command signal 102a of the motor 11 on the basis of a pressure control parameter such that the pressure detection signal 109 follows the pressure command signal 100; the position control unit 62 that calculates the speed command signal 104a of the motor 11 on the basis of a position control parameter such that the current position signal 114 follows the position command signal 111 that is either one of the internal position-command signal 102a and the external position-command signal 110; and the speed control unit 23 that calculates the torque command signal 106 or a force command signal for the motor 11 on the basis of a speed control parameter such that the speed detection signal 108 follows the speed command signal 104a. The motor control device 10a is a motor control device that has features that include the following: the overshoot-amount detection unit 43 that detects an overshoot amount from a target value response and the pressure-control-unit parameter adjustment unit 41. With the pressure-control-unit parameter adjustment unit 41 in which, in a state of pressing the mechanical load (the pressurizing head 14) against the pressurization target 15, only a pressure control parameter of the pressure control unit 21a is changed while a speed control parameter of the speed control unit 23 is fixed; the pressure control parameter is changed from a control parameter setting with a narrow control bandwidth of the pressure control unit 21a so as to extend the control bandwidth of the pressure control unit 21a; and the control parameter of the pressure control unit 21a is adjusted such that the control bandwidth of the pressure control unit 21a is narrower than that with a control parameter of the pressure control unit 21a when an overshoot amount detected by the overshoot-amount detection unit 43 exceeds an overshoot threshold. According to the present embodiment, even if the characteristics of a pressurization target are unknown, a control parameter during pressure control can be adjusted such that oscillation or excessive overshoot is not generated. The control parameter of the pressure control and the control parameter of the position control that is a minor loop in the pressure control are adjusted not in an associated manner but individually. Therefore, in an operation in which the mechanical load approaches the pressurization target (in a state where the mechanical load is not in contact with the pressurization target), it is possible to implements control that prevents overshoot and oscillation in the position. Further, in an operation in which the mechanical load pressurizes the pressurization target (in a state where the mechanical load is in contact with the pressurization target), it is possible to implement pressure control that prevents the generation of oscillation. While, with the present embodiment, there is a description of an example of detecting both an oscillation amount and an overshoot amount and adjusting the control parameter of the pressure control such that the oscillation amount and the overshoot amount are less than the respective thresholds, it is permissible to detect only the oscillation amount and adjust the control parameter of the pressure control so that only the oscillation amount is less than the oscillation threshold. Note that it is permissible to detect only the overshoot amount and adjust the control parameter of the pressure control such that only the overshoot amount is less than the overshoot threshold. When only the oscillation amount is detected, it is possible to adjust the control parameter of the pressure control that makes the oscillation amount become less than a predetermined value. When only the overshoot amount is detected, it is possible to adjust the control parameter of the pressure control that makes the overshoot amount become less than a predetermined value.

Third Embodiment

The description of the first embodiment has an example of detecting an oscillation in control state quantity information while a motor is being operated to perform a pressurization operation or a depressurization operation on a pressurization target and adjusting a control parameter of pressure control on the basis of an oscillation amount. However, when the control parameter of the pressure control is adjusted on the basis of the oscillation amount, it is not always necessary to perform the pressurization operation or the depressurization operation. As long as oscillation is generated in a certain operation, the present invention can be applied, and such a case is described in the present embodiment.

Figure 11:
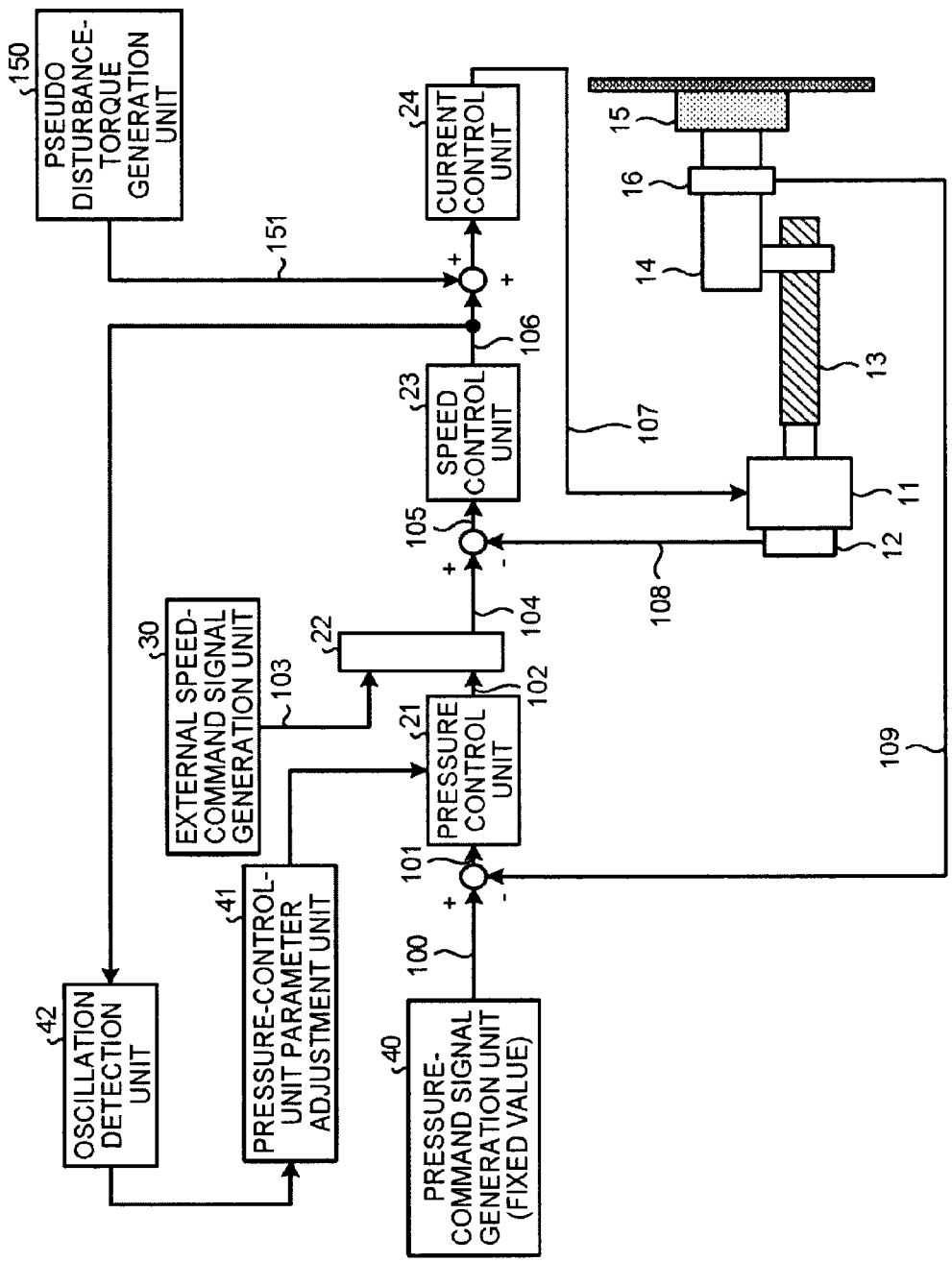
FIG. 11 is a block diagram illustrating a configuration of a motor control device according to a third embodiment.

FIG. 11 is a block diagram illustrating a configuration of a motor control device according to a third embodiment of the present invention. Because the parts designated by like reference signs as those of FIG. 1 operate in the same manner as those of FIG. 1, the descriptions of the first embodiment are applied thereto and detailed descriptions thereof are omitted. The motor control device illustrated in FIG. 11 does not include the overshoot-amount detection unit 43 illustrated in FIG. 1.

The motor control device illustrated in FIG. 11 includes a pseudo disturbance-torque generation unit 150, and a pseudo disturbance-torque command signal 151 is added to the torque command signal 106 or a force command signal output from the speed control unit 23. The pseudo disturbance-torque generation unit 150 outputs (applies) the pseudo disturbance-torque command signal 151 during the adjusting of the control parameter of pressure control and outputs the pseudo disturbance-torque command signal 151 having a value of 0 in cases other than the case of adjusting the control parameter of the pressure control. If some disturbance is applied to a mechanical load during pressure control of pressurizing a pressurization target, a pressure detection signal that follows a pressure command signal is varied, and, to cause the pressure detection signal to follow the pressure command signal, the pressure control unit 21 outputs a speed command signal that is larger than a steady state (i.e., a state where a detected pressure signal is substantially fixed). At this time, if the control parameter of the pressure control unit 21 has a value larger than an appropriate value, oscillation is easily generated. Even if the pseudo disturbance-torque command signal 151 that is independent of the torque command signal 106 or a force command signal output from the speed control unit 23 is added during the pressure control, a pressure detection signal is varied and thus it is possible to simulate a condition in which oscillation is easily generated even when a pressure command value has a fixed value.

Figure 12:
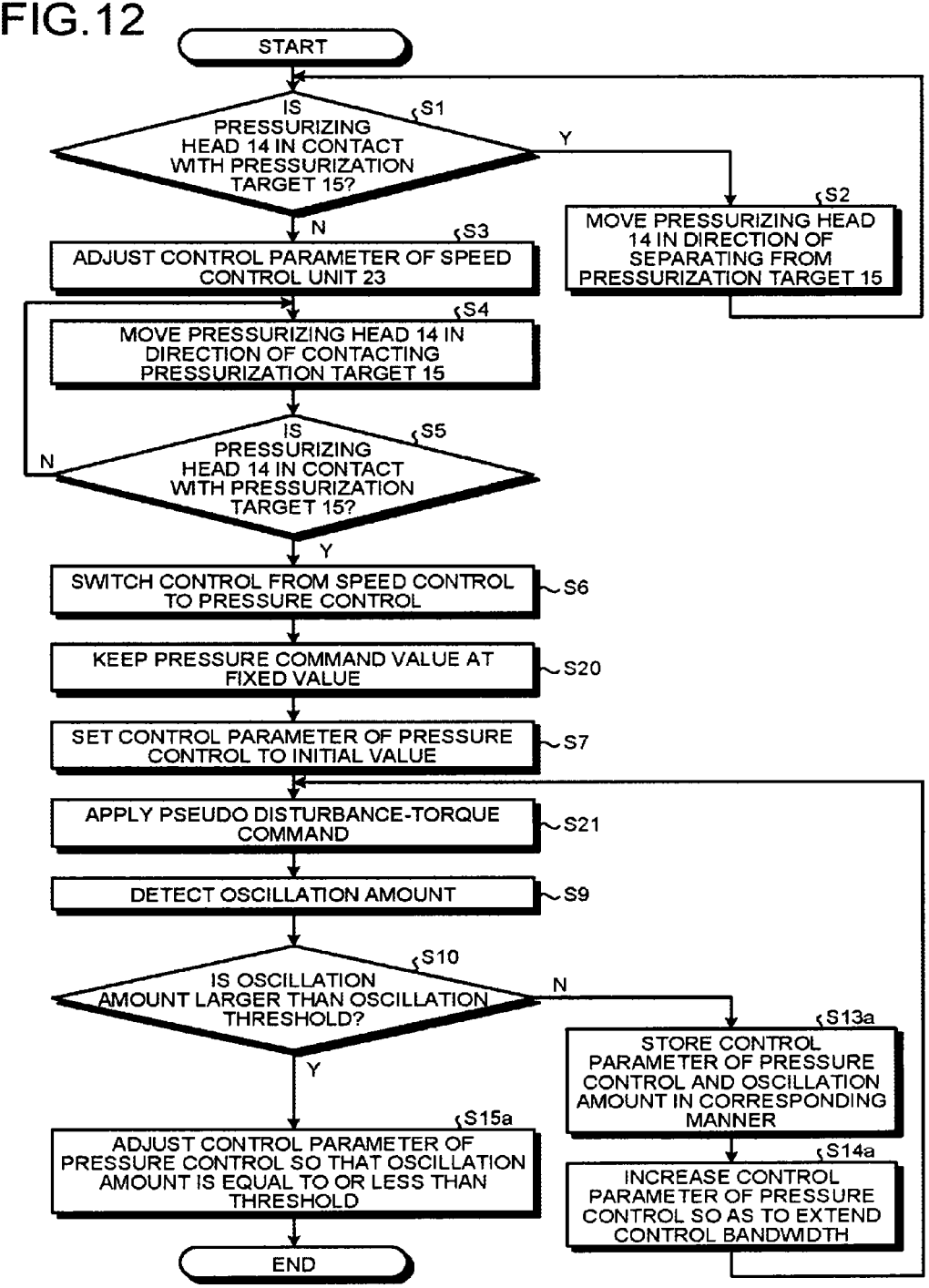
FIG. 12 is a flowchart illustrating a process performed by a pressure-control-unit parameter adjustment unit according to the third embodiment.

FIG. 12 is a flowchart illustrating a process performed by the pressure-control-unit parameter adjustment unit 41. The descriptions of the first embodiment are applied to the steps that are designated by like step numbers as those of FIG. 4, and detailed descriptions thereof are omitted.

The processes up to Step S6 are identical to those of FIG. 4. That is, in a state where a mechanical load is not in contact with a pressurization target, a control parameter of the speed control unit 23 that is a minor loop of the pressure control unit 21 is adjusted and after adjusting the control parameter, the mechanical load is moved so as to make contact with the pressurization target and control is switched from speed control to pressure control.

Next, a value of the pressure command signal 100 output from the pressure-command signal generation unit 40 is kept at a fixed value (Step S20); a control parameter of the pressure control is set to an initial value (Step S7); and the pseudo disturbance-torque generation unit 150 applies the pseudo disturbance-torque command signal 151 (Step S21).

Figure 13:
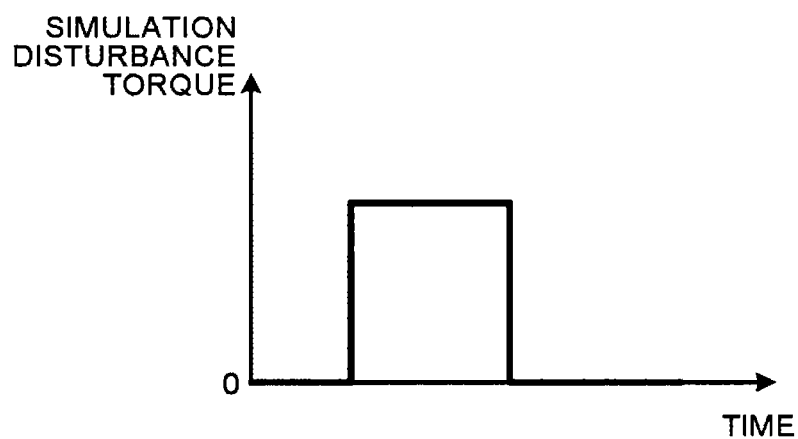
FIG. 13 is a diagram illustrating a temporal change in the value of a pseudo disturbance-torque command signal according to the third embodiment.

FIG. 13 is a diagram illustrating a temporal change in the pseudo disturbance-torque command signal 151. As illustrated in FIG. 13, an example of the pseudo disturbance-torque command signal 151 is a rectangular signal (a pulse signal) whose value is switched from 0 to a predetermined value, kept at the predetermined value for a predetermined period of time, and returned to 0 again. However, the shape of the pseudo disturbance-torque command signal 151 is not limited to the shape illustrated in FIG. 13 as long as the pseudo disturbance-torque command signal 151 is generated independently of a torque command signal generated by the speed control unit 23 (i.e., independently of the speed command signal 104 and the speed detection signal 108).

Next, the oscillation detection unit 42 detects an oscillation amount when the pseudo disturbance-torque command signal 151 is applied (Step S9). It is then determined whether the oscillation amount detected by the oscillation detection unit 42 exceeds an oscillation threshold (Step S10). If it is determined that the oscillation amount exceeds the oscillation threshold (branches to Y), the process proceeds to Step S15a, and the control parameter is adjusted such that the oscillation amount is equal to or less than the threshold (Step S15a). If it is determined that the oscillation amount does not exceed the oscillation threshold (branches to N), the process proceeds to Step S13a, and the control parameter of the pressure control and the oscillation amount are stored in an associated manner (Step S13a). The control parameter of the pressure control is changed so as to extend the control bandwidth (Step S14a). The process then returns to Step S21 and the identical process is repeated until the oscillation amount exceeds the oscillation threshold. If the oscillation amount exceeds the oscillation threshold, the process proceeds to Step S15a; the relation stored at Step S13a between the control parameter of the pressure control and the oscillation amount is referred to; the control parameter of the pressure control is selected and adjusted such that the oscillation amount is equal to or less than the threshold; and the processing ends.

When the process of adjusting the control parameter of the pressure control unit 21 ends, the pseudo disturbance-torque command generation unit 150 outputs the pseudo disturbance-torque command signal 151, which in this case has a value of 0. The pressure-control-unit parameter adjustment unit 41 performs the processes as described above with reference to FIG. 12, and thus an appropriate control parameter used for the pressure control can be obtained.

According to the present embodiment, even if characteristics of a pressurization target are unknown, it is possible to adjust a control parameter of pressure control such that an undesirable oscillation phenomenon is not generated during the pressure control. As is the case in the first embodiment, the control parameter of the pressure control and a control parameter of speed control that is a minor loop of the pressure control are adjusted not in an associated manner but individually. Therefore, in an operation in which a mechanical load approaches a pressurization target (in a state where the mechanical load is not in contact with the pressurization target), it is possible to implement control that prevents generation of overshoot and oscillation in the speed. Further, in an operation in which the mechanical load pressurizes the pressurization target (in a state where the mechanical load is in contact with the pressurization target), it is possible to implement pressure control that prevents generation of oscillation. While the present embodiment has a description of a case where a minor loop of a pressure control unit is speed control, as described in the second embodiment, note that even if the minor loop of the pressure control unit is position control, the present embodiment can be applied to such a case, and the effects described above can be also obtained in this case.

INDUSTRIAL APPLICABILITY

As described above, the motor control device according to the present invention is useful for an industrial machine that includes a mechanical drive unit that applies pressure to various pressurization targets including a workpiece and the like, and it is particularly suitably used with a molding machine, a bonding machine, and the like.

REFERENCE SIGNS LIST 11 motor,
12 encoder,
13 ball screw,
14 pressurizing head,
15 pressurization target,
16 pressure detector,
10 motor control device,
21, 21a pressure control unit,
22 speed-command selection unit,
23, 23a speed control unit,
24 current control unit,
30 external speed-command signal generation unit,
40 pressure-command signal generation unit,
41 pressure-control-unit parameter adjustment unit,
42 oscillation detection unit,
43 overshoot-amount detection unit,
51 high-pass filter,
52 absolute-value computation unit,
53 low-pass filter,
60 external position-command signal generation unit,
61 position-command selection unit,
62, 62a position control unit,
100 pressure command signal,
101, 105, 112, 113 signal,
102 internal speed-command signal,
102a internal position-command signal,
103 external speed-command signal,
104, 104a speed command signal,
106 torque command signal,
107 current,
108 speed detection signal,
109 pressure detection signal,
110 external position-command signal,
111 position command signal,
114 current position signal,
150 pseudo disturbance-torque generation unit,
151 pseudo disturbance-torque command signal,
S1 to S15, S1a, S4a, S6a, S13a to S15a, S20, S21 step.

The invention claimed is:
1. A motor control device comprising:
a motor;

a speed detection unit that detects or estimates a speed of the motor;
a mechanical drive unit that drives a mechanical load by an operation of the motor;
a pressure detection unit that detects, as a pressure detection signal, information on pressure or force when the mechanical load is pressed against a pressurization target;
a pressure control unit that calculates an internal speed-command signal for the motor on the basis of a pressure control parameter such that the pressure detection signal follows a pressure command signal;
a speed control unit that calculates a torque command signal or a force command signal for the motor on the basis of a speed control parameter such that a speed detection signal follows a speed command signal that is either one of the internal speed-command signal and an external speed-command signal;
an oscillation detection unit that detects an oscillation of control state quantity; and
a pressure-control-unit parameter adjustment unit in which,
in a state where the mechanical load does not make contact with the pressurization target and after the speed control parameter is adjusted, and in a state of the mechanical load being pressed against the pressurization target, the pressure control parameter is changed while the speed control parameter is fixed,
the pressure control parameter is changed to extend from a setting with a narrow control bandwidth of the pressure control unit to a wide control bandwidth; and
when the oscillation detection unit detects oscillation, the control parameter of the pressure is adjusted such that the control bandwidth of the pressure control is narrower than that with a control parameter of the pressure at the time of the detection of the oscillation.

2. The motor control device according to claim 1, wherein the pressure control parameter is adjusted under a state where
pressurization operations or depressurization operations are repeated while the mechanical load is in contact with the pressurization target, and
oscillation amount or overshoot amount is detected while pressure is being controlled.

3. The motor control device according to claim 1, wherein in a state of a pressure value being fixed without performing a pressurization operation or a depressurization operation, the oscillation detection unit detects an oscillation of control state quantity when a torque command signal or a force command signal is applied from outside independently of a torque command signal or a force command signal for the motor calculated by the speed control unit.

4. A motor control device comprising:
a motor;
a speed detection unit that detects or estimates a speed of the motor;
a mechanical drive unit that drives a mechanical load by an operation of the motor;
a pressure detection unit that detects, as a pressure detection signal, information on pressure or force when the mechanical load is pressed against a pressurization target;
a pressure control unit that calculates an internal speed-command signal for the motor on the basis of a pressure control parameter such that the pressure detection signal follows a pressure command signal;
a speed control unit that calculates a torque command signal or a force command signal for the motor on the basis of a speed control parameter such that a speed detection signal follows a speed command signal that is either one of the internal speed-command signal and an external speed-command signal;
an overshoot-amount detection unit that detects an overshoot amount from a target value response; and
a pressure-control-unit parameter adjustment unit in which,
in a state where the mechanical load does not make contact with the pressurization target and after the speed control parameter is adjusted, and in a state of the mechanical load being pressed against the pressurization target, the pressure control parameter is changed while the speed control parameter is fixed,
the pressure control parameter is changed to extend from a setting with a narrow control bandwidth of the pressure control unit to a control bandwidth with a wide control bandwidth of the pressure control unit, and
the control parameter of the pressure is adjusted such that the control bandwidth of the pressure is narrower than that with a control parameter of the pressure when an overshoot amount detected by the overshoot-amount detection unit exceeds an overshoot threshold.

5. The motor control device according to according to claim 4, wherein
the pressure control parameter is adjusted under a state where
pressurization operations or depressurization operations are repeated while the mechanical load is in contact with the pressurization target, and
oscillation amount or overshoot amount is detected while pressure is being controlled.

6. A motor control device comprising:
a motor;
a speed detection unit that detects or estimates a speed of the motor;
a mechanical drive unit that drives a mechanical load by an operation of the motor;
a pressure detection unit that detects information on pressure or force when the mechanical load is pressed against a pressurization target as a pressure detection signal;
a pressure control unit that calculates an internal position-command signal for the motor on the basis of a pressure control parameter such that the pressure detection signal follows a pressure command signal;
a position control unit that calculates a speed command signal for the motor on the basis of a position control parameter so as to cause a current position signal to follow a position command signal that is either one of the internal position-command signal and an external position-command signal;
a speed control unit that calculates a torque command signal or a force command signal for the motor on the basis of a speed control parameter such that a speed detection signal follows the internal speed-command signal;
an oscillation detection unit that detects an oscillation of control state quantity; and
a pressure-control-unit parameter adjustment unit in which, in a state where the mechanical load does not make contact with the pressurization target and after the speed control parameter and the position control parameter are adjusted, and in a state of the mechanical load being pressed against the pressurization target, the pressure control parameter is changed while a position control parameter and the speed control parameter are fixed, the pressure control parameter is changed to extend from a setting with a narrow control bandwidth of the pressure control unit to a wider control bandwidth of the pressure control unit, and when the oscillation detection unit detects oscillation, the control parameter of the pressure is adjusted such that the control bandwidth of the pressure is narrower than that with a control parameter of the pressure when the oscillation detection unit detects the oscillation.

7. The motor control device according to according to claim 6, wherein the pressure control parameter is adjusted under a state where pressurization operations or depressurization operations are repeated while the mechanical load is in contact with the pressurization target, and oscillation amount or overshoot amount is detected while pressure is being controlled.

8. The motor control device according to claim 6, wherein in a state of a pressure value being fixed without performing a pressurization operation or a depressurization operation, the oscillation detection unit detects an oscillation of control state quantity when a torque command signal or a force command signal is applied from outside independently of a torque command signal or a force command signal for the motor calculated by the speed control unit.

9. A motor control device comprising:

a motor;

a speed detection unit that detects or estimates a speed of the motor;

a mechanical drive unit that drives a mechanical load by an operation of the motor;

a pressure detection unit that detects information on pressure or force when the mechanical load is pressed against a pressurization target as a pressure detection signal;

a pressure control unit that calculates an internal speed-command signal for the motor on the basis of a pressure control parameter such that the pressure detection signal follows a pressure command signal;

a position control unit that calculates a speed command signal for the motor on the basis of a position control parameter such that a current position signal follows a position command signal that is either one of the internal position-command signal and an external position-command signal;

a speed control unit that calculates a torque command signal or a force command signal for the motor on the basis of a speed control parameter such that a speed detection signal follows the internal speed-command signal;

an overshoot-amount detection unit that detects an overshoot amount from a target value response; and a pressure-control-unit parameter adjustment unit in which, in a state where the mechanical load does not make contact with the pressurization target and after the speed control parameter and the position control parameter are adjusted, and in a state of the mechanical load being pressed against the pressurization target, the pressure control parameter is changed while the speed control parameter and the position control parameter are fixed, the pressure control parameter is changed to extend from a setting with a narrow control bandwidth to a wide control bandwidth, and the control parameter of the pressure is adjusted such that the control bandwidth of the pressure is narrower than that with a control parameter of the pressure when an overshoot amount detected by the overshoot-amount detection unit exceeds an overshoot threshold.

10. The motor control device according to according to claim 9, wherein the pressure control parameter is adjusted under a state where pressurization operations or depressurization operations are repeated while the mechanical load is in contact with the pressurization target, and oscillation amount or overshoot amount is detected while pressure is being controlled.

* * * * *